US008007401B2

(12) United States Patent
Saito et al.

(10) Patent No.: US 8,007,401 B2
(45) Date of Patent: Aug. 30, 2011

(54) HYBRID VEHICLE DRIVE CONTROL APPARATUS AND METHOD

(75) Inventors: Katsuyuki Saito, Hadano (JP); Munetoshi Ueno, Atsugi (JP); Jun Nakanowatari, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 780 days.

(21) Appl. No.: 12/061,963

(22) Filed: Apr. 3, 2008

(65) Prior Publication Data

US 2008/0293538 A1 Nov. 27, 2008

(30) Foreign Application Priority Data

May 2, 2007 (JP) ................................ 2007-121679
Mar. 4, 2008 (JP) ................................ 2008-054011

(51) Int. Cl.
*B60K 1/02* (2006.01)
*B60W 10/00* (2006.01)

(52) U.S. Cl. ...................................... 477/3; 180/65.265

(58) Field of Classification Search . 477/3; 180/65.265, 180/65.28, 65.285
See application file for complete search history.

(56) References Cited

U.S. PATENT DOCUMENTS 5,841,201 A * 11/1998 Tabata et al. ................ 290/40 C
5,939,794 A 8/1999 Sakai et al.
6,054,844 A * 4/2000 Frank ............................. 322/16
6,083,138 A 7/2000 Aoyama et al.
6,083,139 A * 7/2000 Deguchi et al. ................... 477/5
7,017,348 B2 3/2006 Tajima et al.
7,784,575 B2 * 8/2010 Yamanaka et al. ....... 180/65.275
7,878,281 B2 * 2/2011 Tanishima .............. 180/65.265
2002/0175011 A1 11/2002 Nogi et al.
2005/0288148 A1 12/2005 Kuras et al.
2006/0048988 A1 3/2006 Dreibholz et al.
2006/0199696 A1 * 9/2006 Gouda et al. ...................... 477/3
2006/0231306 A1 * 10/2006 Severinsky et al. .......... 180/65.2

FOREIGN PATENT DOCUMENTS

CN 1944139 A 4/2007
DE 10 2004 013 581 A1 11/2004
JP 2006-301195 A 11/2006

* cited by examiner

*Primary Examiner* — Roger Pang
(74) *Attorney, Agent, or Firm* — Young Basile

(57) ABSTRACT

A hybrid vehicle drive control apparatus and method for a vehicle including an engine and a motor-generator are taught herein. When a drive mode requested by a driver is a power mode that attaches greater importance to an acceleration performance than to fuel consumption efficiency, a power mode engine torque that is larger than an optimum fuel consumption efficiency engine torque is used as a target engine torque of the engine.

13 Claims, 13 Drawing Sheets

START OF DRIVE CONTROL
S1
IN POWER MODE?
NO
YES
S2
MOTOR/GENERATOR IS NOT ASSISTING?
YES
NO
S3
DETERMINATION OF TARGET ENGINE TORQUE AT POWER MODE
S4
DETERMINATION OF TARGET ENGINE TORQUE AT USUAL TIME
END

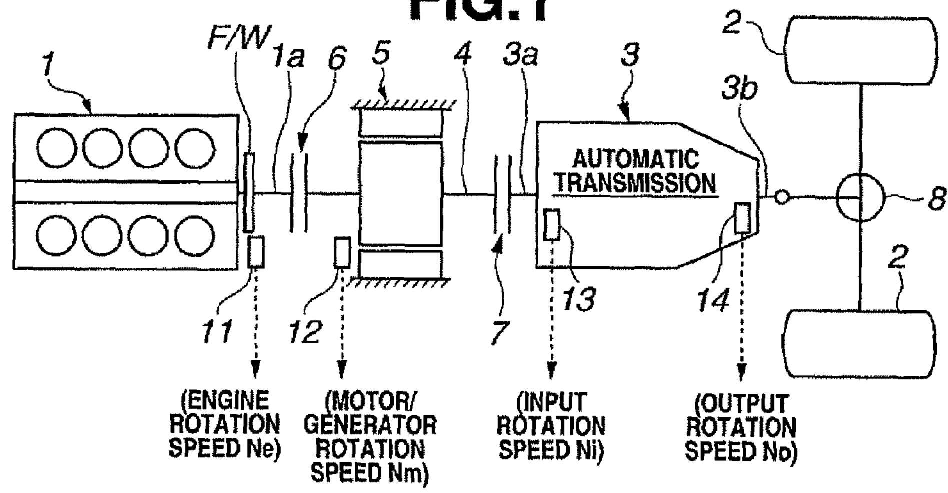
FIG.1
F/W
1a
6
5
4
3a
3
2
3b
1
AUTOMATIC TRANSMISSION
8
13
14
11
12
7
(ENGINE ROTATION SPEED Ne)
(MOTOR/ GENERATOR ROTATION SPEED Nm)
(INPUT ROTATION SPEED Ni)
(OUTPUT ROTATION SPEED No)

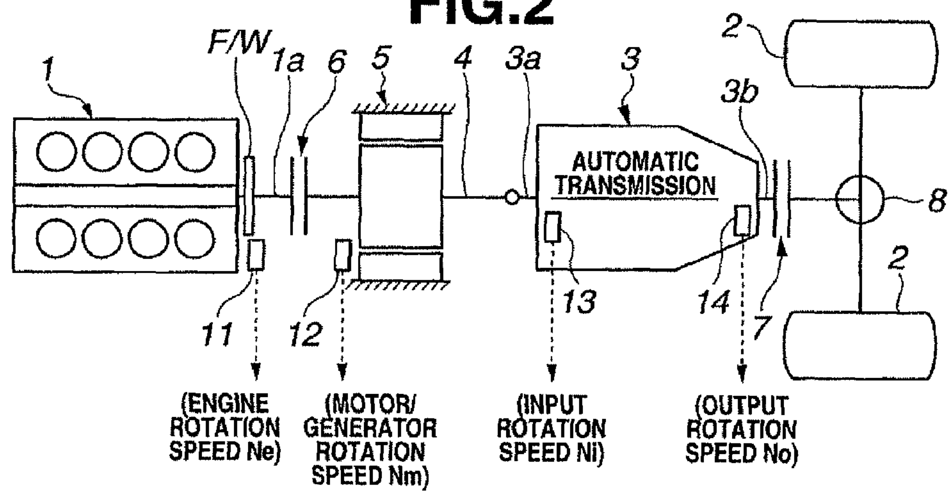
FIG.2
F/W
1a
6
5
4
3a
3
2
3b
1
AUTOMATIC TRANSMISSION
8
13
14
11
12
7
(ENGINE ROTATION SPEED Ne)
(MOTOR/ GENERATOR ROTATION SPEED Nm)
(INPUT ROTATION SPEED Ni)
(OUTPUT ROTATION SPEED No)

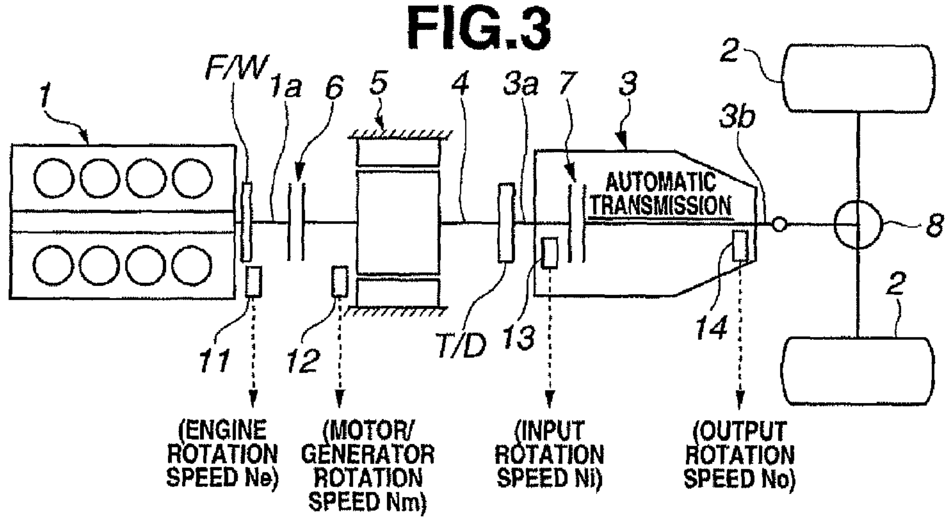
FIG.3
F/W
1a
6
5
4
3a
7
3
2
3b
1
AUTOMATIC TRANSMISSION
8
T/D
13
14
11
12
(ENGINE ROTATION SPEED Ne)
(MOTOR/ GENERATOR ROTATION SPEED Nm)
(INPUT ROTATION SPEED Ni)
(OUTPUT ROTATION SPEED No)

HYBRID VEHICLE POWERTRAIN
1
ENGINE
11
Ne
12
Nm
13
Ni
14
No
6
FIRST CLUTCH
7
SECOND CLUTCH
(SHIFT INSTRUCTION FOR ROLLBACK PREVENTION)
5
MOTOR/ GENERATOR
(tTc1: tPc1)
(tTc2: tPc2)
21
ENGINE CONTROLLER
(tTe)
(Ne) (Nm) (Ni) (No)
INTEGRATED CONTROLLER
(APO) (SOC)
20
(tTm, tNm)
22
MOTOR/ GENERATOR CONTROLLER
10
INVERTOR
(Temp)
TEMPERATURE SENSOR
17
APO
15
(SOC)
16
BATTERY
9

RESPONSE DELAY OF MOTOR
ACCELERATOR OPENING DEGREE
POWER MODE FLAG
TORQUE
ROTATION SPEED
SOC
ACCELERATION
DRIVE TORQUE
ENGINE
MOTOR/ GENERATOR
ENGINE
MOTOR
RAPID RISE OF ACCELERATION
t1 t2
t
0
1

RESPONSE DELAY OF MOTOR
ACCELERATOR OPENING DEGREE
POWER MODE FLAG
TORQUE
ROTATION SPEED
SOC
ACCELERATION
DRIVE TORQUE
ENGINE
MOTOR/GENERATOR
ENGINE
MOTOR
0
1
0
0
0
t0
t11
t1 t2
t

RESPONSE DELAY OF MOTOR
RESPONSE DELAY OF ENGINE
ACCELERATOR OPENING DEGREE
POWER MODE FLAG
TORQUE
ROTATION SPEED
SOC
ACCELERATION
DRIVE TORQUE
ENGINE
MOTOR/ GENERATOR
ENGINE
MOTOR
SLOW RISE OF ACCELERATION
0
1
0
0
0
t0
t1
t2
t3
t

HYBRID VEHICLE DRIVE CONTROL APPARATUS AND METHOD

CROSS-REFERENCE TO RELATED APPLICATIONS

This application claims priority from Japanese Patent Application Serial No. 2007-121679, filed May 2, 2007, and No. 2008-054011, filed Mar. 4, 2008, each of which is incorporated herein in its entirety by reference.

TECHNICAL FIELD

The invention relates generally to a hybrid vehicle drive control apparatus and method that improves the response of a drive power to an accelerator pedal operation by a driver.

BACKGROUND

Unexamined Japanese Patent Publication No. 2006-301195 discloses one type of a hybrid drive apparatus for hybrid vehicles. In this hybrid drive apparatus, a target drive torque for a vehicle wheel drive system, a target motor-generator torque and a target engine torque are calculated based on an accelerator pedal depression amount, vehicle speed, state of charge of a battery and engine speed.

As taught therein, a target drive torque is calculated based on an accelerator pedal depression amount and a vehicle speed. Then, an engine torque that optimizes the fuel consumption efficiency of the engine is retrieved based on an engine rotation speed by reference to a fuel consumption efficiency optimizing control map. A retrieved fuel consumption efficiency optimizing engine torque is determined as a target engine torque. Then, a target motor-generator torque is determined so that the sum of the target engine torque and the target motor-generator torque is equal to the target drive torque.

BRIEF SUMMARY

Embodiments of a hybrid vehicle drive control apparatus for a vehicle including an engine and a motor-generator are taught herein. One such apparatus includes a controller. The controller, for example, is configured to control a motor-generator torque of the motor-generator to obtain a target drive torque wherein the target drive torque is equal to the sum of an engine torque of the engine and the motor-generator torque. The controller is also configured to determine whether a drive mode requested by a driver is a power mode that attaches greater importance to an acceleration performance than to a fuel consumption efficiency and to use a power mode engine torque that is larger than an optimum fuel consumption efficiency engine torque as a target engine torque of the engine when the drive mode requested by the driver is the power mode.

Methods for controlling a hybrid vehicle are also taught herein. An example of one method includes controlling a motor-generator torque of the motor-generator to obtain a target drive torque wherein the target drive torque is equal to the sum of an engine torque of the engine and the motor-generator torque and using a power mode engine torque that is larger than an optimum fuel consumption efficiency engine torque as a target engine torque of the engine when acceleration performance is preferred over fuel consumption efficiency.

BRIEF DESCRIPTION OF THE DRAWINGS

The description herein makes reference to the accompanying drawings wherein like reference numerals refer to like parts throughout the several views, and wherein:

FIG. 1 is a schematic plan view of a powertrain for a hybrid vehicle to which a control apparatus according to a first embodiment of the invention can be applied;

FIG. 2 is a schematic plan view of another powertrain for a hybrid vehicle to which the control apparatus according to the first embodiment of the invention can be applied;

FIG. 3 is a schematic plan view of a still other powertrain for a hybrid vehicle to which the control apparatus according to the first embodiment of the invention can be applied;

DETAILED DESCRIPTION OF EMBODIMENTS OF THE INVENTION

Figure 4:
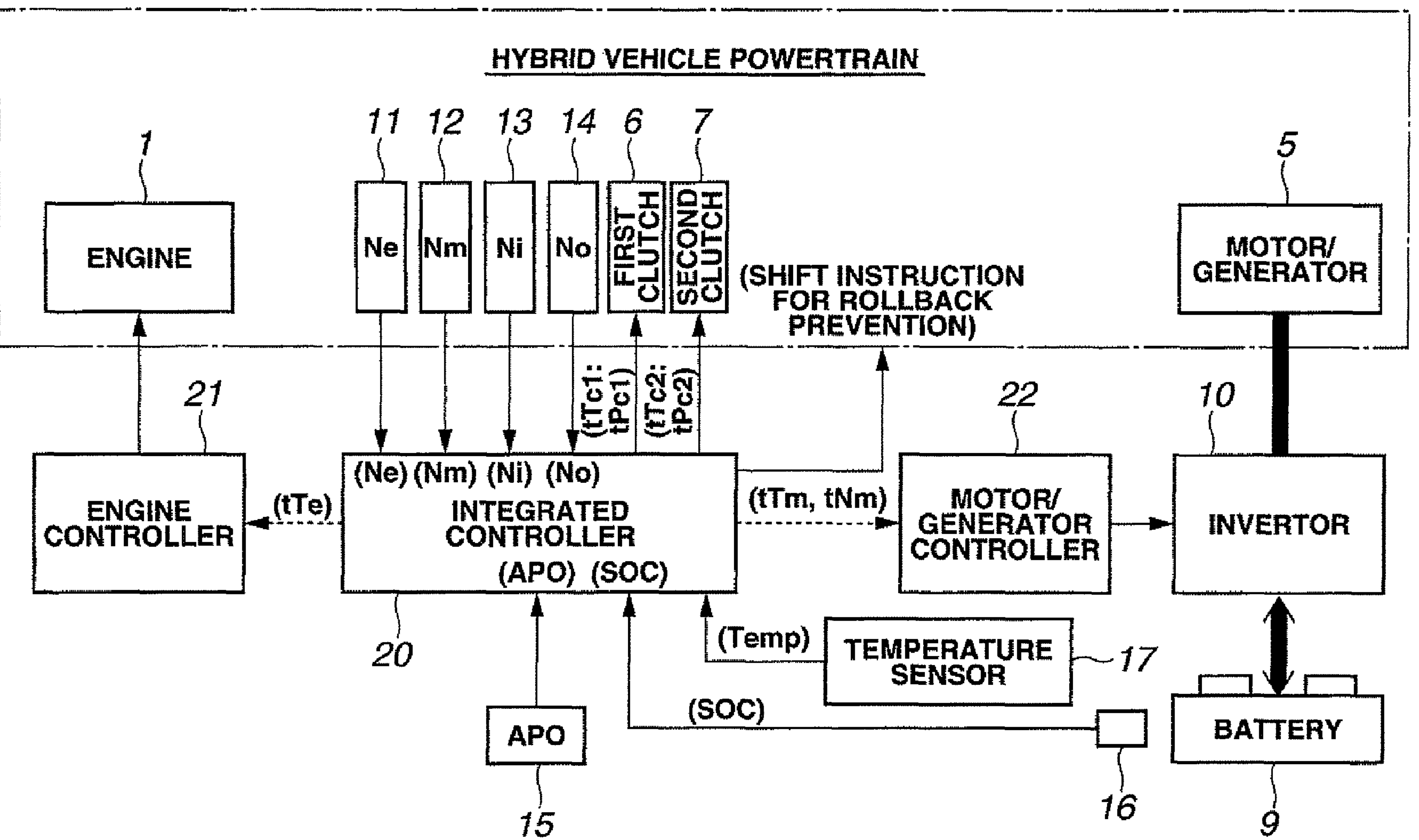
FIG. 4 is a block diagram of a control system for the powertrains shown in FIGS. 1 to 3.

In the hybrid vehicle described above, where a driver requires a drive mode of a high torque and low fuel consumption efficiency more than a drive mode of a low torque and high fuel consumption efficiency, and a vehicle is driven so as to make the acceleration performance higher in response to the requirement (called power mode or sport mode), a target drive torque according to an accelerator pedal depression amount must be output.

The responsiveness to the accelerator pedal depression amount is increased by varying a target motor-generator torque that is quickly responsive to an input/output instruction. If a target drive torque exceeds the input/output limits of the motor-generator torque, the target drive torque cannot be dealt with by only a variation of the target motor-generator torque. It is then necessary to vary the target engine torque. However, the response of the engine to the output instruction is slower than the response of the motor-generator to the output instruction. For this reason, the responsiveness to the accelerator pedal depression amount decreases, thus being incapable of satisfying the requirement of the driver for the acceleration performance sufficiently.

In contrast, embodiments of the invention propose a control technique that can realize a driving torque of a good responsiveness when a drive mode required by the driver is a power mode that attaches greater importance to the acceleration performance, though it is a goal for the control to drive the vehicle based on the target engine torque that optimizes the fuel consumption efficiency. Since the engine torque set is larger than the engine torque that optimizes the fuel consumption efficiency at the power mode, it is possible to increase the engine torque and realize the target drive torque by the control of the quick-response motor-generator torque. Accordingly, it becomes unnecessary to vary the engine torque in accordance with the accelerator pedal depression amount at the power mode, thus making it possible to realize a drive torque that has a good responsiveness.

Hereinafter, the invention is described based on embodiments shown in the drawings.

FIG. 1 shows a powertrain for a front engine rear wheel drive type hybrid vehicle equipped with an engine 1 and at least one driving wheel (rear wheel) 2. Similarly to a conventional rear wheel drive vehicle, an automatic transmission 3 is disposed rearward of the engine 1 along a vehicle longitudinal direction and in tandem relation with the same. A motor-generator 5 is disposed so as to be connected to a shaft 4 that transmits rotation from the engine 1 (crankshaft 1*a*) to an input shaft 3*a* of the automatic transmission 3.

The motor-generator 5 functions as a motor and as a generator (dynamo) and is disposed between the engine 1 and the automatic transmission 3. Between the motor-generator 5 and the automatic transmission 3, more specifically between the shaft 4 and the engine crankshaft 1*a*, is disposed a first clutch 6. The clutch 6 separably connects the engine 1 and the motor-generator 5. In this instance, the first clutch 6 is of the kind capable of varying a transmission torque capacity continuously, for example, constituted by a wet type multi-disc clutch that continuously controls a flow rate of clutch working oil and a clutch working oil pressure using a proportional solenoid.

Between the motor-generator 5 and the automatic transmission 3, more specifically between the shaft 4 and the transmission input shaft 3*a*, is disposed a second clutch 7. The second clutch 7 separably connects the motor-generator 5 and the automatic transmission 3. Similarly to the first clutch 6, the second clutch 7 is also of the kind capable of varying the transmission torque capacity continuously, for example, constituted by a wet type multi-disc clutch that continuously controls a flow rate of clutch working oil and a clutch working oil pressure using a proportional solenoid.

The automatic transmission 3 selectively engages or releases a plurality of frictional elements (clutch, brake, etc.) to construct transmission paths (shift stages) with combinations of engaged and released frictional elements. Accordingly, the automatic transmission 3 changes the speed of rotation of the input shaft 3*a* with a gear ratio corresponding to a selected shift stage and outputs the rotation to the output shaft 3*b*. The output rotation is distributively transmitted by way of a final reduction gear 8 to the left and right rear wheels 2 and is used to drive of the vehicle. However, the automatic transmission 3 is not limited to the above-described stepwise variable type but can be a continuously variable transmission that varies the shift stage from an existing shift stage to a target shift stage continuously.

In the powertrain shown in FIG. 1, for the electric vehicle (EV) mode that is used at low load-low speed including starting from stoppage, the first clutch 6 is released and the second clutch 7 is engaged to bring the automatic transmission 3 into a power transmitting state.

When the motor-generator 5 is driven under this condition, only the output rotation from the motor-generator 5 is transmitted to the transmission input shaft 3*a*. The automatic transmission 3 changes the speed of rotation transmitted to the input shaft 3*a* according to the selected shift stage and outputs the rotation from the transmission output shaft 3*b*. The rotation from the transmission output shaft 3*b* is then transmitted by way of differential gear unit 8 to the rear wheels 2 to enable the vehicle to perform EV drive only by the motor-generator 5.

In the case of a hybrid electric vehicle (HEV) drive that is used at high-speed drive or high-load drive, the first clutch 6 is engaged to use the motor-generator 5 as a starter to start the engine 1. Then, where the first clutch 6 and the second clutch 7 are both engaged, the automatic transmission 3 is brought into a power transmitting state. Under this condition, the output rotation from the engine 1 or the output rotation from both the engine 1 and the motor-generator 5 are transmitted to the transmission input shaft 3*a*. The automatic transmission 3 changes the speed of rotation transmitted to the input shaft 3*a* according to the selected shift stage and outputs the rotation from the transmission output shaft 3*b*. The rotation from the transmission output shaft 3*b* is then transmitted by way of the differential gear unit 8 to the rear wheels 2 to enable the vehicle to perform HEV drive by both the engine 1 and the motor-generator 5.

During the HEV drive, a surplus of energy is provided when the engine 1 is operated so as to attain optimum fuel consumption efficiency. The surplus of energy is converted to electric power by operating the motor-generator 1, using the surplus of energy, as a generator. The generated electric power is then collected for use in the motor drive of the motor-generator 5, whereby it becomes possible to improve the fuel consumption efficiency of the engine 1.

While the second clutch 7 that separably connects the motor-generator 5 and the driving wheels 2 is disposed between the motor-generator 1 and the automatic transmission 3, the second clutch 7 can be interposed between the automatic transmission 3 and the differential gear unit 8 to perform the same function as shown in FIG. 2.

Further, looking at FIGS. 1 and 2, while the second clutch 7 is shown disposed forward or rearward of the automatic transmission 3, frictional elements for selection of forward shift stages or frictional elements for selection of a rearward gear stage that are already provided within the automatic transmission 3 may be used as the second clutch 7 as shown in FIG. 3. When this is the case, the second clutch 7 additionally brings the automatic transmission 3 into a power transmitting state when engaged to perform the above-described mode selection function, thus eliminating the necessity of a dedicated second clutch 7 and resulting in a cost advantage.

The engine 1, motor-generator 5, first clutch 6 and second clutch 7 that constitute the hybrid vehicle powertrain shown in FIGS. 1 to 3 is controlled by a control system such as that shown in FIG. 4.

The control system of FIG. 4 includes an integrated controller 20 for controlling operating points (torque and rotation speed) of the powertrain using a target engine torque tTe, a target motor-generator torque tTm, a target transmission torque capacity tTc1 of the first clutch 6 and a target transmission torque capacity tTc2 of the second clutch 7.

A signal from an engine rotation sensor 11 indicates an engine rotation speed Ne. A signal from a motor-generator rotation sensor 12 indicates a motor-generator rotation speed Nm. A signal from an input rotation sensor 13 indicates a transmission input rotation speed Ni. A signal from an output rotation sensor 14 indicates a transmission output rotation speed No. A signal from an accelerator opening degree sensor 15 indicates an accelerator pedal depression amount (accelerator opening degree APO) that represents a drive power required from the powertrain, and a signal from a state-of-charge sensor 16 indicates a state of charge SOC (electric power that can be taken out) of the battery 9 that stores the electric power for the motor-generator 5. These signals are all input to the integrated controller 20 for determination of the operating points of the powertrain.

Of the above-described sensors, the engine rotation sensor 11, motor-generator rotation sensor 12, input rotation sensor 13 and output rotation sensor 14 can be disposed as shown in FIGS. 1 to 3, respectively.

The integrated controller 20 selects, based on the accelerator opening degree APO, the state of charge SOC of the battery and transmission output rotation speed No (vehicle speed VSP), a drive mode (EV mode, HEV mode) that can realize a vehicle drive power required by a driver. The integrated controller 20 also calculates the target engine torque tTe, target motor-generator torque tTm, target first clutch transmission torque capacity tTc1 and target second clutch transmission torque capacity tTc2. The target engine torque tTe is supplied to an engine controller 21, and the target motor-generator torque tTm is supplied to a motor-generator controller 22.

The engine controller 21 controls the engine 1 so that the engine torque Te becomes equal to the target engine torque tTe, and the motor-generator controller 22 controls the motor-generator 5 by way of the battery 9 and an inverter 10 so that the torque Tm (or rotation speed Nm) of the motor-generator 5 becomes equal to the target motor-generator torque tTm (or target motor-generator rotation speed tNm). The integrated controller 20 supplies a solenoid current corresponding to the target first clutch transmission torque capacity tTc1 (first clutch instruction pressure tPc1) and the target second clutch transmission torque capacity tTc2 (second clutch instruction pressure tPc2) to hydraulic control solenoids (not shown) of the first clutch 6 and second clutch 7 and controls the engagement forces of the first clutch 6 and second clutch 7 independently so that the transmission torque capacity Tc1 (first clutch pressure Pc1) of the first clutch 6 becomes equal to the target transmission torque capacity tTc1 (first clutch instruction pressure tPc1) and the transmission torque capacity Tc2 (second clutch pressure Pc2) of the second clutch 7 becomes equal to the target second clutch transmission torque capacity tTc2 (second clutch instruction pressure tPc2).

Figure 5:
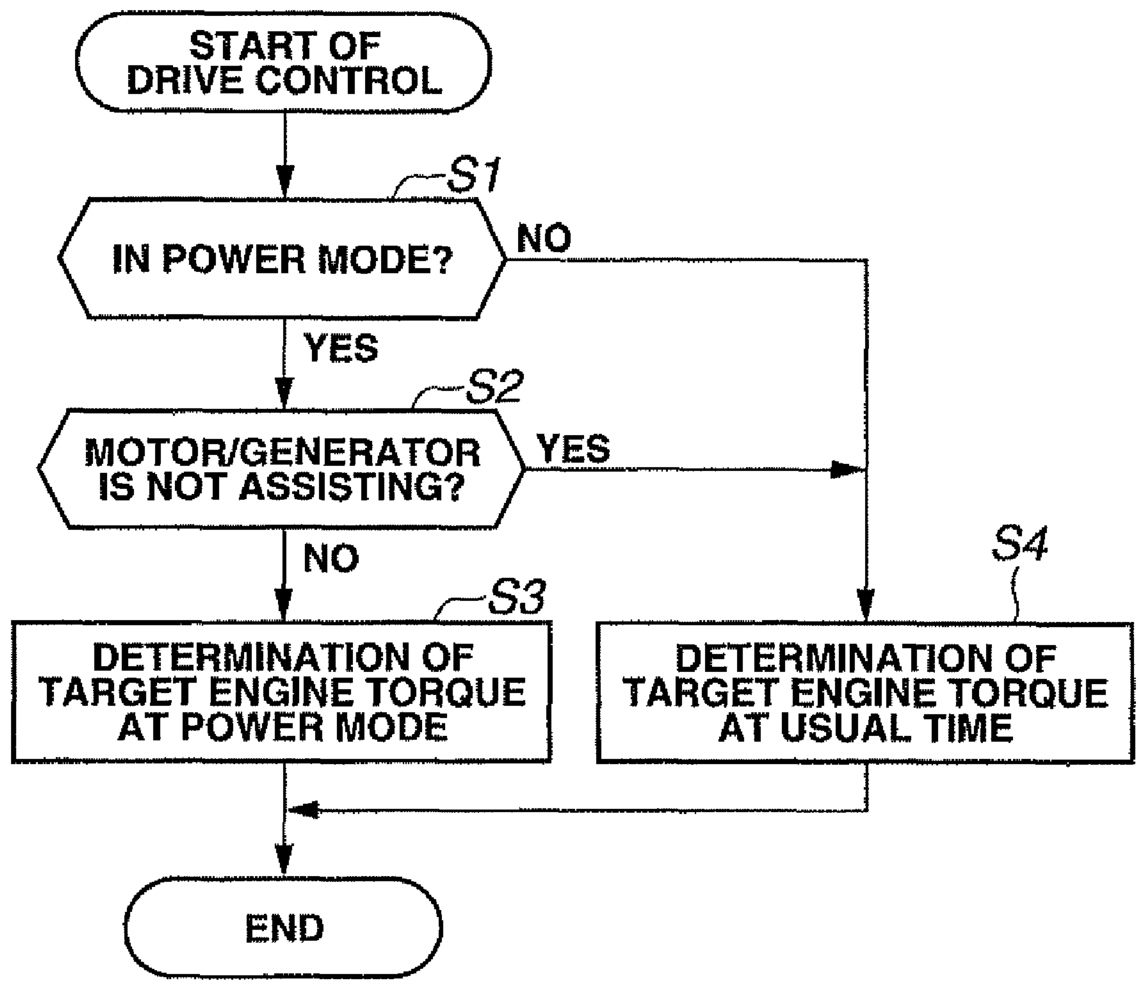
FIG. 5 is a flowchart showing a control of a target engine torque calculated by an integrated controller of FIG. 4.
Figure 9:
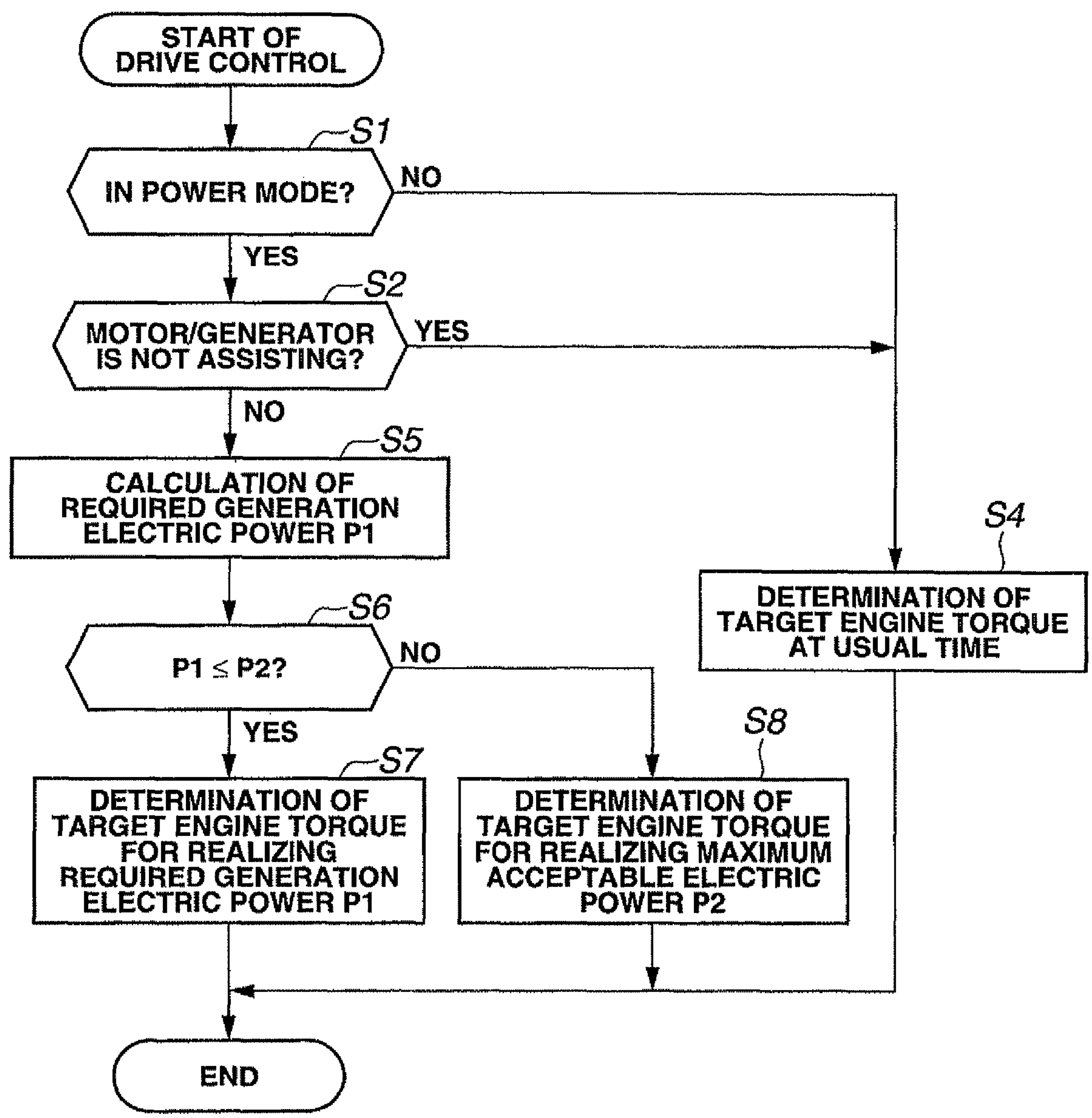
FIG. 9 is a flowchart of another control of a target engine torque that is calculated by the integrated controller of FIG. 4 according to a second embodiment of the invention.

In addition, the integrated controller 20 executes the control programs shown in FIGS. 5 and 9 to thereby execute target engine torque control according to the invention and realizes an improvement in the responsiveness to the accelerator pedal depression amount.

Each of the controllers, such as integrated controller 20, etc., is here implemented by, for example, a respective microcomputer including a random access memory (RAM), a read-only memory (ROM) and a central processing unit (CPU) in addition to various input and output connections. Generally, the control functions described herein and associated with each controller are performed by execution by the CPU of one or more software programs stored in ROM. Of course, some or all of the sections and their associated functions can be implemented by hardware components. While three controllers are described, more or fewer are also possible.

FIG. 5 is a flowchart showing target engine torque control according to an embodiment of the invention. First, in step S1 it is determined whether a drive mode by the operation of a driver is in a power mode. More specifically, whether there is a driver's requirement for acceleration performance is detected from an accelerator pedal operation. For example, an amount of accelerator pedal depression by the driver is stored one by one, and the accelerator pedal depression amounts within a predetermined past period of time are integrated. Then, when the integrated amount exceeds a predetermined value, it is concluded that the driver prefers acceleration over fuel consumption efficiency, and the drive mode is switched to the power mode. In the power mode, the motor torque of the motor-generator 5 is added to the engine torque of the engine 1 for its assistance to thereby improve the acceleration performance as compared with the usual driving conditions where the driver does not prefer the acceleration performance. This is similar in the case of deceleration. Accordingly, the rates of increase/decrease for the target outputs tTe, tTm, tNm are made larger at the power mode where a requirement for acceleration performance is detected than those at the usual time at which such a demand is not detected.

When it is determined in step S1 that the drive mode is not in the power mode (NO), the control goes to step S4.

In step S4 a drive control for a hybrid vehicle under normal, or usual, driving conditions is executed. Since the driver does not usually require such a high acceleration performance, the target engine torque is controlled so as to attain an optimum fuel consumption efficiency to give priority to fuel consumption efficiency. The process thus ends.

Figure 13:
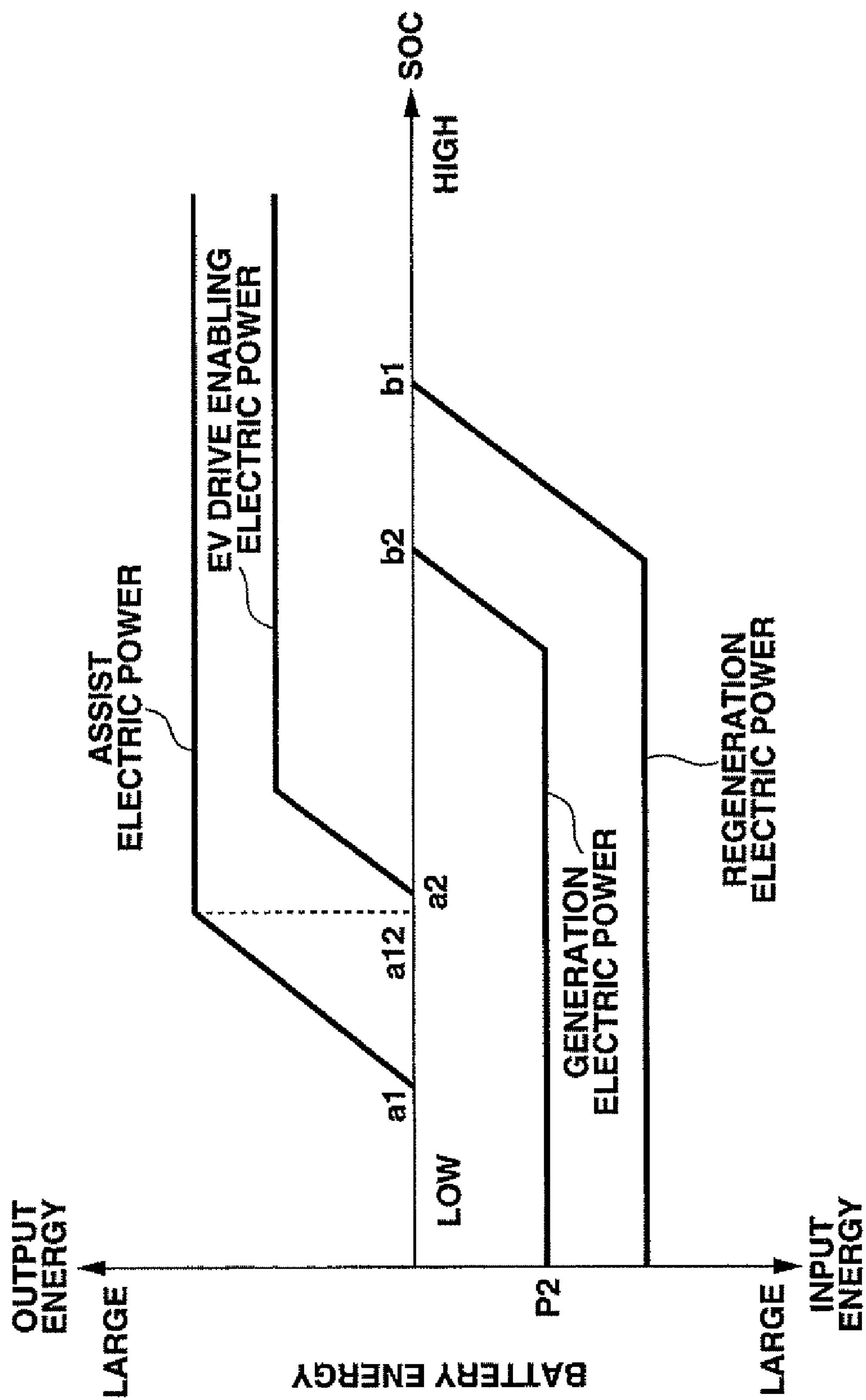
FIG. 13 is a chargeable/dischargeable electric power graph according to the second embodiment.
Figure 16:
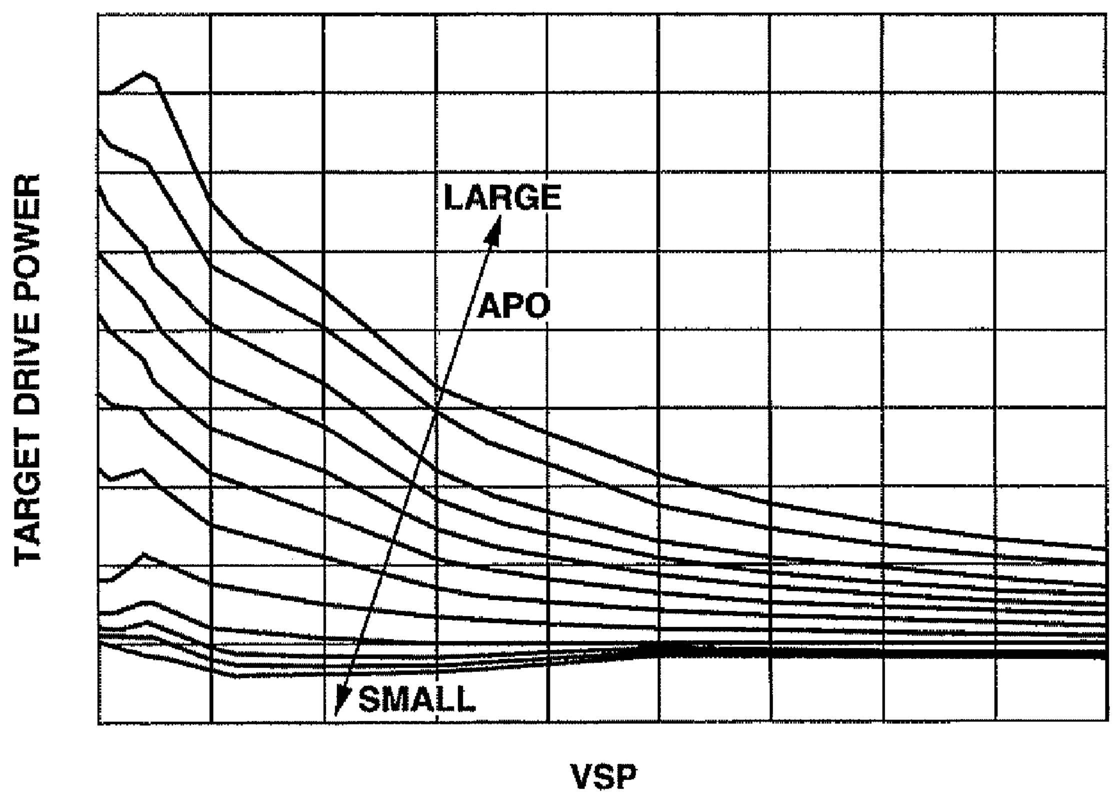
FIG. 16 is a graph showing an example of a target drive power graphs used for calculation of a target drive power by the integrated control described in FIG. 4.

Optimum fuel consumption efficiency control is now described. First, a target drive torque to be supplied to a hybrid vehicle wheel drive system is calculated using an accelerator pedal depression amount and vehicle speed with a drive power graph such as that shown in FIG. 16. From the target drive torque and vehicle speed, a target drive power is calculated. Next, a target battery chargeable/dischargeable electric power is determined from the state of charge SOC of the battery 9 by reference to a battery chargeable/dischargeable electric power map shown by way of example in FIG. 13. Briefly, and as shown in FIG. 13, an output energy (battery discharge amount) is made larger as the state of charge SOC becomes higher, and an input energy (battery charge amount) is made larger as the state of charge SOC becomes smaller. A detailed description of FIG. 13 is made hereinafter.

The target battery charge/discharge electric power corresponds to the target motor-generator torque. The target motor-generator torque is thus usually controlled based on the state of charge SOC of the battery. The sum of the target drive power and the target battery charge/discharge electric power is determined as a target engine power. Then, a target engine torque that optimizes the fuel consumption efficiency when this target engine power is generated by the engine is retrieved by reference to an operating point map for fuel consumption efficiency optimizing control, shown by example in FIG. 14. With reference to the fuel consumption efficiency optimizing control graph of FIG. 14, the abscissa indicates the engine rotation speed, the ordinate indicates the engine torque, and the dotted curve a is a fuel consumption efficiency optimizing torque line. Then, the target engine torque is calculated so that the operating point e comprised of engine rotation speed and engine torque lies on the fuel consumption efficiency optimizing torque line $\alpha$.

Figure 14:
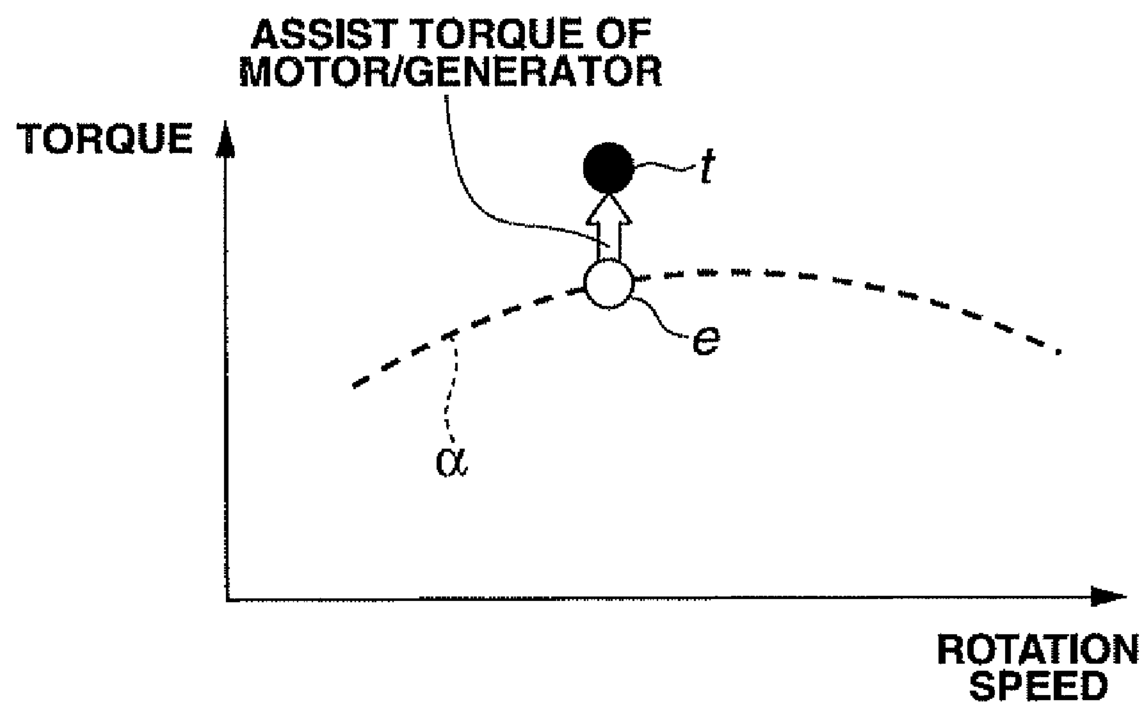
FIG. 14 is a fuel consumption efficiency optimizing control graph according to the second embodiment.

FIG. 14 further indicates the input shaft rotation speed and the input shaft torque of the transmission input shaft 3*a* of the automatic transmission 3 by the operating point t. The input torque is obtained by dividing the drive torque of the wheels 2 by the fixed transmission ratio of the differential gear unit 8 and the transmission ratio of the automatic transmission 3. In case, as shown in FIG. 14, the input torque defining the operating point t is larger than the fuel consumption efficiency optimizing engine torque defining the operating point e, so the motor-generator 5 functions as a motor to perform a power running and assists the engine torque in the direction of white arrow. Namely, the target drive torque is realized as the sum of the motor-generator torque and the target engine torque.

Accordingly, in a case where the target drive torque of a hybrid vehicle is realized by the sum of the target motor-generator torque and the target engine torque, the vehicle is driven to run by the target engine torque that optimizes the fuel consumption efficiency. In this manner, the fuel consumption efficiency is improved.

Returning now to step S1 of FIG. 5, if it is determined that the drive mode is in the power mode (YES), the control goes to step S2.

In step S2 it is determined whether the motor-generator 5 does not or does function as a motor to perform a power running and to add motor torque to the engine torque, that is, whether the motor-generator is not assisting. Since the motor-generator 5 cannot be used as a generator if assisting (YES), the control goes to step S4 to execute optimum fuel consumption efficiency control according to usual operation times. In contrast since the motor/generator 5 can be used as a generator if it is determined in step S2 that the motor-generator is not assisting (NO), the control goes to step S3 under this circumstance.

In step S3, a hybrid vehicle target engine torque control in the power mode is executed. Then, control is ended. The target engine torque control in step S3 determines a power mode engine torque larger than the target engine torque calculated in step S4 and optimizes the fuel consumption efficiency as a target value. A target drive torque is realized so that the rear wheels 2 are driven by a part of the power mode engine torque, and in addition the motor-generator 5 is operated as a generator so that engine power generation is performed by a part of the power mode engine torque.

More specifically, for example, by maximizing the throttle opening degree of the engine 1, the power mode engine torque is made equal to the maximum engine torque at the present engine rotation speed. Further, the drive power output by the transfer shaft 4 is calculated from the drive torque of the rear wheels 2 and the wheel speed of the rear wheels 2, and the generation electric power by the motor-generator 5 is calculated by subtracting the drive power from the engine power that is the output of the crankshaft 1*a*. That is, the power mode engine torque is sufficiently large so that the target drive torque at the power mode is smaller than the power mode engine torque. The motor-generator torque is determined so as to assume a negative value.

Figure 6:
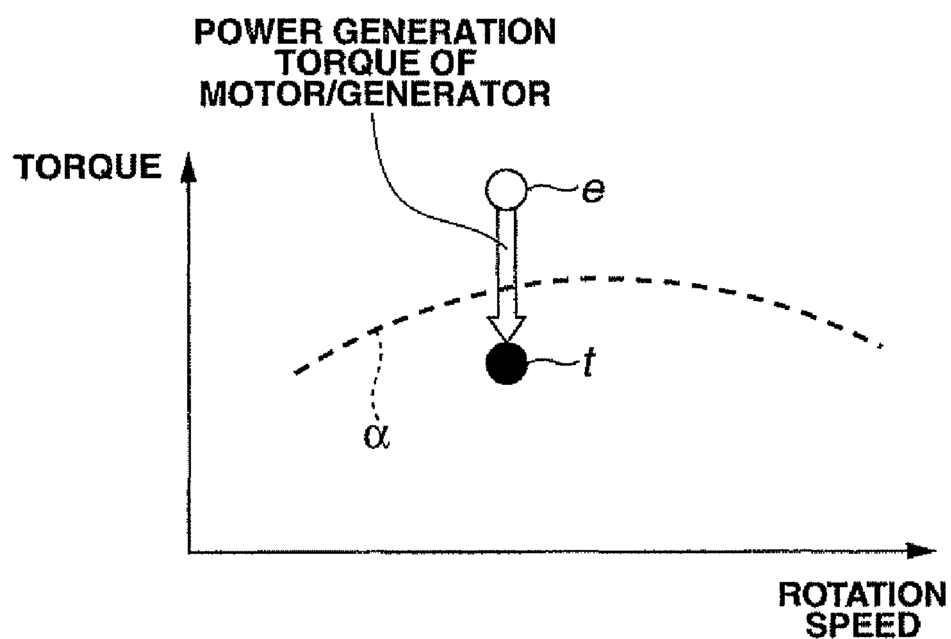
FIG. 6 is a graph showing an engine torque and a generator torque determined by the control of FIG. 5.

Assuming that the power mode engine torque output by the crankshaft 1*a* is represented by an operating point e and the transmission input shaft torque corresponding to the target drive torque is represented by the operating point t, FIG. 6 is obtained. Similarly to the fuel consumption efficiency optimizing control map of FIG. 14, FIG. 6 is also an operating point map consisting of an ordinate and an abscissa. Further, a fuel consumption efficiency optimizing torque line at is also shown for comparison. As shown in FIG. 6, the power mode engine torque represented by the operating point e is positioned above the fuel consumption efficiency optimizing torque line a (on the large torque side) and larger than the optimum fuel consumption efficiency engine torque.

Since the power mode engine torque is determined to be larger than the optimum fuel consumption efficiency engine torque as described above, it occurs in almost all cases that the target drive torque indicated by the operating point t becomes smaller than the power mode engine torque indicated by the operating point e. At low-load drive where the accelerator pedal depression amount is small, the power mode engine torque is larger than the target drive torque as a matter of course. Thus, by making the motor-generator 5 function as a generator and generating electric power using the engine 1 to thereby make the motor-generator torque assume a negative value as indicated by the downward arrow in FIG. 6, the target drive torque is realized.

In contrast, at high-load drive where the accelerator pedal depression is large, there may occur such a case where the target drive torque that is determined by the accelerator pedal opening degree APO and the vehicle speed (transmission output rotation speed No) becomes larger than the power mode engine torque. In the operating point map of FIG. 7, there is shown a state in which the target drive torque indicated by the operating point t is larger than the power mode engine torque indicated by the operating point e. Accordingly, in this case the target drive torque is realized by making the motor-generator 5 function as a motor to perform a power running for thereby making the motor-generator torque assume a positive value as indicated by an upward arrow in FIG. 7.

Figure 8:
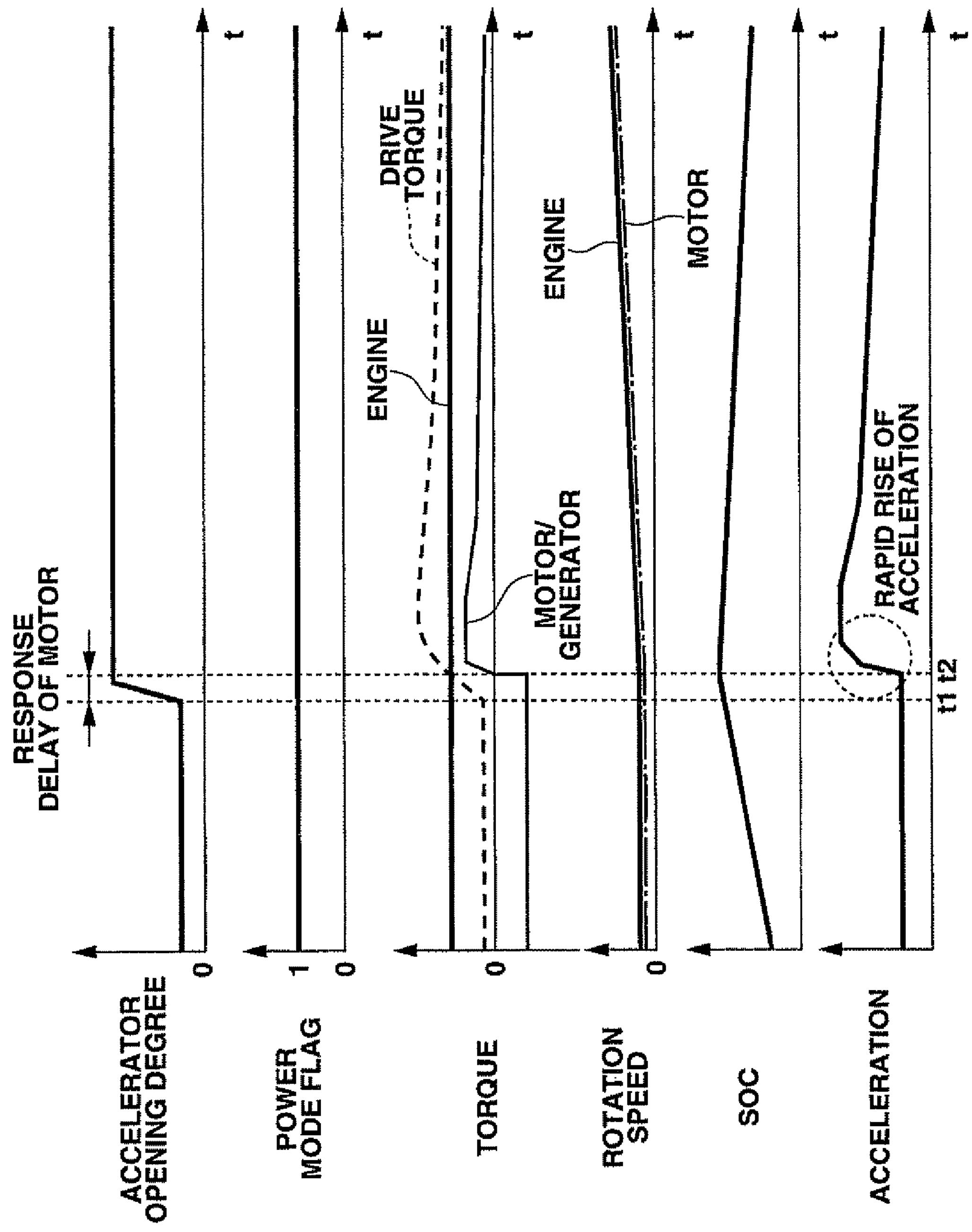
FIG. 8 is a time chart showing a variation of a vehicle drive torque by the control described in FIG. 5.
Figure 15:
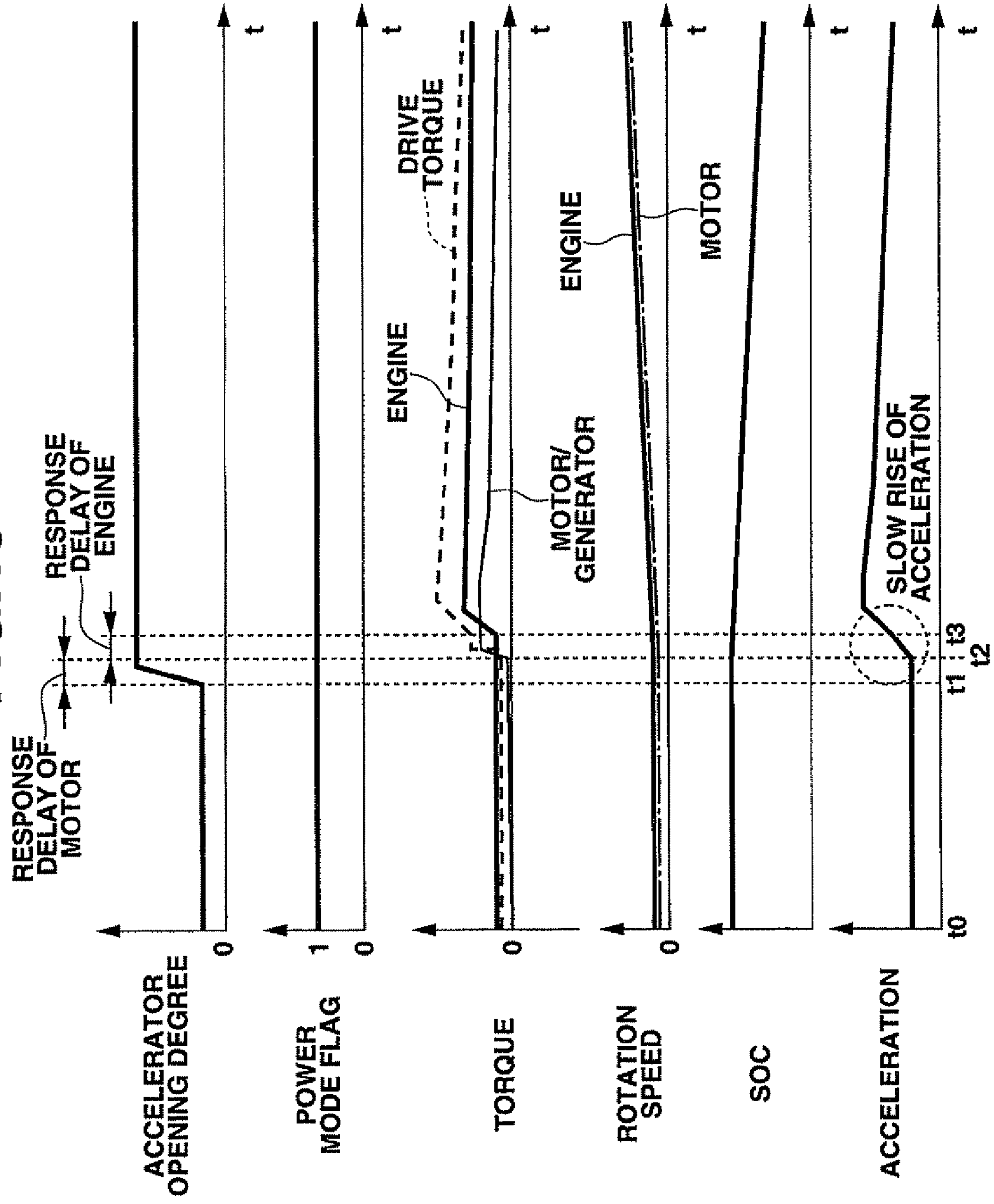
FIG. 15 is a time chart showing a variation of a vehicle drive torque according a comparative example.

A variation of a drive torque arising in a case where the control of this embodiment is not performed is shown as a comparative example in the time chart of FIG. 15, and by making reference to the time chart of FIG. 8.

First, the comparative example is described with reference to FIG. 15. Before the moment t1, there is performed a low-load operation where the accelerator opening degree is close to zero and the drive torque is close to zero. The power mode flag indicative of the power mode is 1 during the time before and after the moment t1. In the time chart of FIG. 15, the engine rotation speed and the motor rotation speed are the same and low since the first clutch 6 and the second clutch 7 are engaged. The state of charge SOC of the battery 9 is sufficiently high so as to be capable of outputting an assist electric power shown in FIG. 13. The motor-generator torque is nearly zero, and the drive torque is nearly equal to the engine torque.

When the driver depresses the accelerator pedal largely and rapidly during the consecutive moments from t1 to t2, such an accelerator pedal depression cannot be coped with by only an instruction for increasing the motor-generator torque. Instead, an instruction is issued to increase the engine torque.

By this, the motor-generator torque that is quickly responsive to the accelerator opening degree increases near the moment t2 and is added to the engine torque as an assist. Near the next moment t3, the engine torque that is slowly responsive to the accelerator opening degree increases. The drive torque consisting of the engine torque and the motor-generator torque assumes a maximum value after the moment t3, and in response, the acceleration of the vehicle assumes a peak value after the moment t3. The acceleration of the hybrid vehicle starts increasing immediately after the moment t2 and continues to increase after the moment t3. However, at acceleration, response delay of the engine during the time from the moment t1 to the moment t2 and response delay of the engine during the time from the moment t2 to the moment t3 occur in succession. Such acceleration cannot meet the power mode acceleration requested by the driver.

In this manner, it takes a not insignificant amount of time until the acceleration increases up to the peak value after the depression of the accelerator pedal at the moment t1, and therefore it cannot be said that the responsiveness is good. In the meantime, after the moment t3, the engine rotation speed and the motor rotation speed increase gradually while assuming the same speed. The state of charge SOC of the battery 9 that outputs the assist electric power decreases gradually.

In contrast, in the described embodiment of the invention, if the power mode flag is 1 as shown in the time chart of FIG. 8, the engine torque is made large even at low-load drive before the moment t1, i.e., before the accelerator pedal is depressed and the motor-generator torque is made to assume a negative value (power generation torque). Thereby, a target drive torque (dotted line in FIG. 8) smaller than the engine torque is realized. The downward arrow in FIG. 6 represents the motor-generator torque. By this, before the moment t1, i.e., at low-load drive, the state of charge SOC increases.

Figure 7:
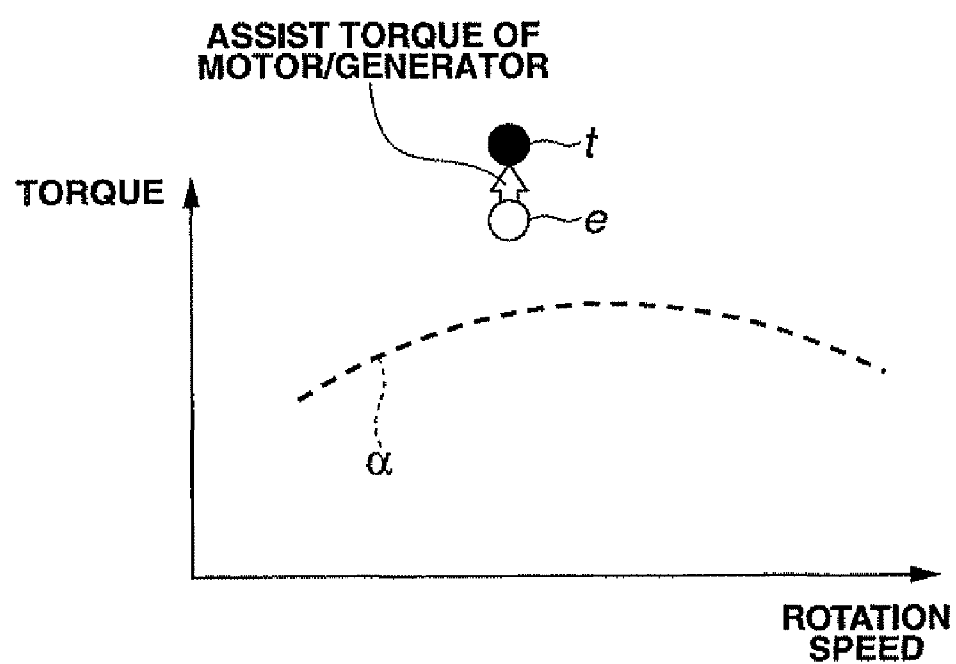
FIG. 7 is a graph view showing a target engine torque and an assist torque that is determined by the control described in FIG. 5.

At the next moment t2, the motor-generator torque is increased rapidly so as to assume a positive value (motor torque) so that a target drive torque larger than the engine torque is realized (see FIG. 7). For this reason, after the moment t2, i.e., at high-load drive, the state of charge SOC decreases gradually.

As shown in FIG. 8, since the engine torque is previously made large according to this embodiment, it is not necessary to increase the engine torque after the time the accelerator pedal is depressed (from the moment t1 to the moment t2), and the target drive torque can be realized by only the motor-generator torque. Accordingly, the responsiveness of the drive torque can be improved without being influenced by the engine torque. Accordingly, the acceleration is not influenced by the response delay of the engine, but the power mode acceleration required by the driver can be realized.

In FIG. 8, the accelerator opening degree and the power mode flag are the same as those of the comparative example shown in FIG. 15.

FIG. 9 is a flowchart showing a target engine torque control according to a second embodiment of the invention. In FIG. 9, the steps S1, S2 and S4 are the same as those of the flowchart of FIG. 5, and therefore explanation thereto is omitted for brevity. Different steps are described by adding thereto new reference characters.

If it is determined in step S2 of FIG. 9 that the motor-generator is not assisting (NO), the control goes to step S5. The process steps S5 to S8 execute hybrid vehicle target engine torque control at the power mode. In step S5 the power mode engine torque is calculated and is larger than the target engine torque calculated in step S4 that optimizes the fuel consumption efficiency. The power mode engine torque herein calculated is a maximum throttle opening degree engine torque, that is, an engine torque with the throttle opening degree of the engine 1 being maximized. By multiplying this calculated value of the power mode engine torque by the present engine rotation speed, the engine power is obtained. Further, the drive power (equal to the drive power output by the transmission shaft 4) is calculated by multiplying the target drive torque by the wheel speed of the rear wheels 2. By subtracting the engine power from the drive power, the required generation electric power P1 is calculated.

In the next step S6, based on the state of charge SOC of the battery 9 and referring to the battery chargeable/dischargeable electric power map of FIG. 13, for example, the maximum acceptable electric power of the battery 9, for example, P2, is retrieved. It is further determined whether the required generation electric power P1 is equal to or less than the maximum acceptable electric power P2 of the battery 9. If the required generation electric power P1 is equal to or less than the maximum acceptable electric power P2 (YES), the control goes to step S7.

Additional description is made to the battery chargeable/dischargeable electric power map shown by way of example in FIG. 13. Therein, the abscissa indicates the state of charge SOC of the battery 9 and the ordinate indicates the input/output of the battery 9. On the minus side of the zero point of the ordinate, the motor-generator 5 is operated as a generator to regenerate electric power and input the power to the battery 9 and thereby charge the same. On the other hand, on the plus side of the zero point, the battery 9 is discharged to output electric power to the motor-generator 5 so that the motor-generator 5 is operated as a motor to perform a power running. The electric power input to the battery 9 and the electric power output by the battery 9 are determined based on the state of charge SOC and the operating state of the motor-generator 5.

Where the motor-generator 5 is operated as a motor to thereby assist the engine torque, the battery output is determined by reference to the assist electric power line shown in FIG. 13. SOC value a1 is the smallest state of charge needed for the motor-generator 5 to operate as a motor to perform power running during HEV mode and assist the engine 1 in driving. If the state of charge SOC is higher than a1, an assist electric power is output from the battery 9. The assist electric power, when the state of charge SOC is in the range from the value a1 to the assist limitation starting SOC value a12, increases with the increase to the state of charge SOC, and an assist electric power that is constant irrespective of the state of charge SOC can be output when the state of charge SOC is higher than the assist limitation starting SOC value a12. Since output of the assist electric power causes the battery 9 to discharge and lowers the state of charge SOC, the state of charge SOC goes toward a1. When the state of charge SOC is equal to or smaller than a1, the assist electric power is inhibited. Herein, battery output has the same meaning as battery discharge by which the battery 9 discharges energy. The assist limitation starting SOC value a12 is a threshold value for detecting that the state of charge SOC has come close to a1.

Where the motor-generator 5 is operated as a motor to perform EV drive, the battery output is determined by reference to the EV drive enabling electric power shown in FIG. 13. SOC value a2 is the smallest state of charge SOC that is needed for the motor-generator 5 to be operated as a motor to perform power running during the EV mode. If the state of charge SOC is higher than a2, the EV drive enabling electric power is output. The EV drive enabling electric power increases with the increase to the state of charge SOC when the state of charge SOC is near a2, and an EV drive enabling electric power that is constant irrespective of the state of charge SOC can be output when the state of charge SOC is at a certain high level. Since output of the EV drive enabling electric power decreases the state of charge SOC, the state of charge SOC goes toward a2. When the state of charge SOC is equal to or lower than a2, the EV drive enabling electric power is not output. The constant EV drive enabling electric power is smaller than the constant assist electric power described above, and a2 is larger than a1 in order to secure the electric power and electric energy for enabling the motor-generator 5 to start the engine 1 during the EV mode.

Where a power generation torque is input from the engine 1 to operate the motor-generator 5 as a generator, the battery input is determined by reference to the generation electric power shown in FIG. 13. SOC value b2 is the largest state of charge SOC needed where a power generation torque is input from the engine 1 to the motor-generator 5 to perform engine power generation during the HEV mode. If the state of charge SOC is smaller than b2, the generation electric power is input to the battery 9. The generation electric power, near SOC value b2, increases with the decrease of the state of charge SOC (in FIG. 13, input power increases downward), and when the state of charge SOC is at a certain low level, the constant generation electric power P2 can be input to the battery irrespective of the state of charge SOC. P2 is called the maximum acceptable electric power. Since input of the generation electric power increases the state of charge SOC, the state of charge SOC goes toward b2. When the state of charge SOC is equal to or larger than b2, the generation electric power is not input to the battery 9.

Where regeneration torque is input from the wheels 2 to operate the motor-generator 5 as a generator, the battery input is determined by reference to the regeneration electric power shown in FIG. 13. SOC value b1 is the maximum state of charge in the case where braking torque is input from the wheels 2 to the motor-generator 5 to perform drive regeneration during the EV mode. When the state of charge SOC is smaller than b1, the regeneration electric power is input to the battery 9 to charge the same. The regeneration electric power increases with the decrease of the state of charge SOC when the state of charge SOC is near b1 (in FIG. 13, input power increases downward), and a constant regeneration electric power can be input to the battery 9 irrespective of the state of charge SOC when the state of charge SOC is at a certain low level. Since input of the regeneration electric power to the battery 9 increases the state of charge SOC, the state of charge SoC goes toward b1. When the state of charge SOC is higher than b1, regeneration is inhibited. Battery input herein used has the same meaning as battery charge by which the battery collects energy. The constant regeneration electric power is larger than the constant generation electric power (positioned lower in FIG. 13), and SOC value b1 is larger than SOC value b2 to collect energy as much as possible during the EV mode and making higher the energy efficiency.

The assist electric power, EV drive enabling electric power, generation electric power and regeneration electric power are values that are preferably previously determined by experiments and the like so as to realize optimum fuel consumption efficiency.

Returning to FIG. 9, in step S7 the target engine torque is determined so as to realize the required generation electric power P1. Then, the process ends. The target engine torque herein used is the maximum throttle opening degree engine torque calculated in step S5.

In contrast, where it is determined in step 36 that the required generation electric power P1 is larger than the maximum acceptable electric power P2 (NO), the control goes to step S8, instead of step S7.

In step S8 the target engine torque is determined so as to realize the maximum acceptable electric power P2. Then, the process ends. In this connection, the required generation electric power P1 is not realized to protect the battery 9 from overcharge.

The target engine torque herein determined is not the power mode engine torque equal to the maximum throttle opening degree engine torque that is calculated in step S5 but is the value that is calculated as the power mode engine torque that realizes the target drive torque and generates the maximum acceptable electric power P2 (hereinafter, referred to as engine torque for protection).

Figure 10:
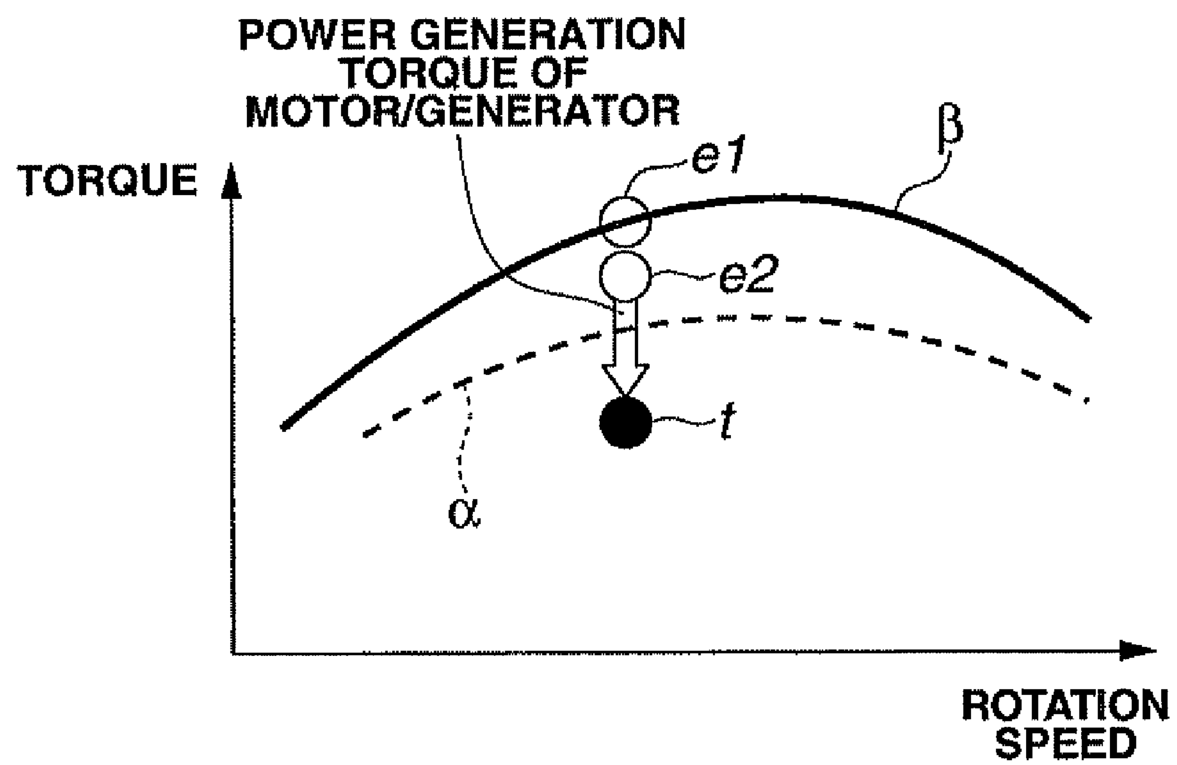
FIG. 10 is a graph view showing an engine torque and a generator torque that is determined by the control described in FIG. 9.

With reference to the operating point map of FIG. 10, explanation is made as to why the target engine torque determined in step S8 is smaller than the maximum throttle opening degree engine torque calculated as the power mode engine torque in step S5.

In the operating point map of FIG. 10 is shown the target engine torque that is calculated by the flowchart of FIG. 9. In FIG. 10, the operating point e1 indicates the power mode engine torque calculated in step S5. The operating point e1 is located above a maximum throttle opening degree torque curve P representing the engine torque at the fully-opened throttle opening degree of the engine 1 and indicates the maximum engine torque at the present engine rotation speed. The operating point e2 indicates the power mode engine torque determined in step S8. Where the answer in step S6 is YES, it is seen in FIG. 10 that the operating point e2 is smaller in torque than the operating point e1. Namely, of the motor-generator torque indicated by the white arrow, the motor-generator torque in the range from the operating point e1 to the operating point t corresponding to the target drive torque of the vehicle is large (long) since point e1 corresponds to the required generation electric power P1. In contrast, the motor-generator torque in the range from the operating point e2 to the operating point t is small (short) since point e2 corresponds to the maximum acceptable electric power P2. Through the determination of the operating point e2 in step S8, overcharge of the battery 9 can be prevented.

Although not shown in FIG. 10, where the answer in step S6 is NO the operating point e2 becomes larger than the operating point e1 so that overcharge is not caused even if the operating point e1 corresponding to power P1 is determined in step S7.

Figure 11:
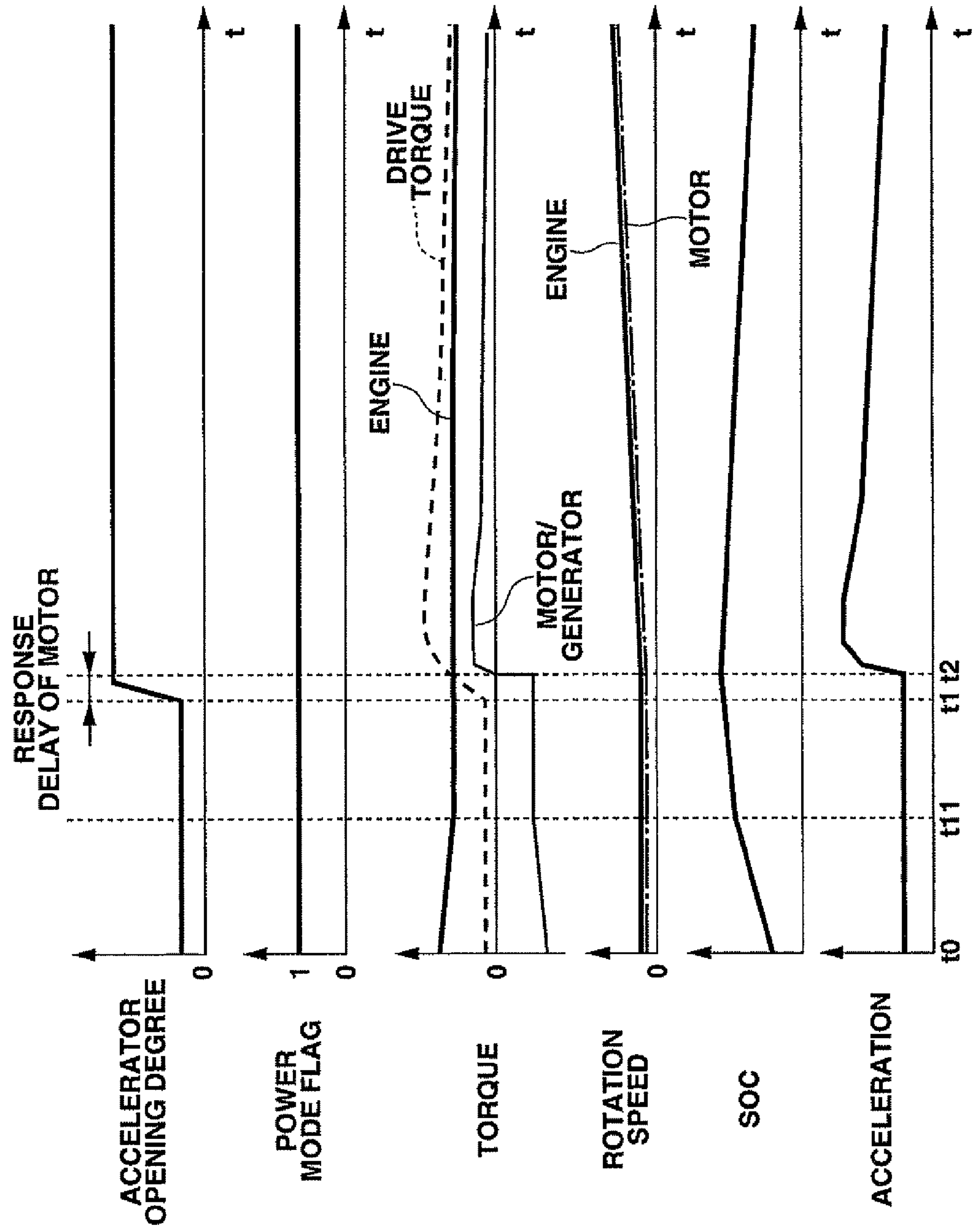
FIG. 11 is a time chart showing a variation of a vehicle drive torque by the control described in FIG. 9.

The effect of the target engine torque control at the power mode according to the second embodiment is next described with reference to the time chart of FIG. 11. In FIG. 11, the accelerator opening degree, power mode flag and rotation speed are the same as those of the embodiment of FIG. 8.

In this embodiment, when the power mode flag is 1 and before the moment to, the maximum throttle opening degree engine torque is determined as the target engine torque (according to step S7), and after the moment t0 the target engine torque is determined so as to realize the maximum acceptable electric power P2 (according to step S8). During the time from the moment t0 to the moment t11, the target engine torque is decreased gradually. Also, the generation electric power (motor-generator torque) is also decreased gradually so that the input torque to the transmission input shaft 3*a*, which is the sum of those torques, is maintained constant. For this reason, the vehicle drive torque as shown by the dotted line in FIG. 11 is constant during the time from the moment t0 to the moment t11. Since during this time the motor-generator torque is determined so as to assume a negative value to perform generation, the state of charge SOC is increased. According to this embodiment, by selecting step S8, the generation torque of the motor-generator during the time from the moment t11 to the moment t1 can be made smaller than the generation torque of the generator before the moment t11 so that the increase variation rate of the state of charge SOC during the time from the moment t11 to the moment t1 can be made smaller. The time chart after the moment t1 is the same as that shown in FIG. 8 so that explanation thereto is omitted for brevity. According to this embodiment, the acceleration is not influenced by the response delay of the engine but the power mode acceleration required by the driver can be realized. In addition, the battery 9 can be protected from overcharge.

Figure 12:
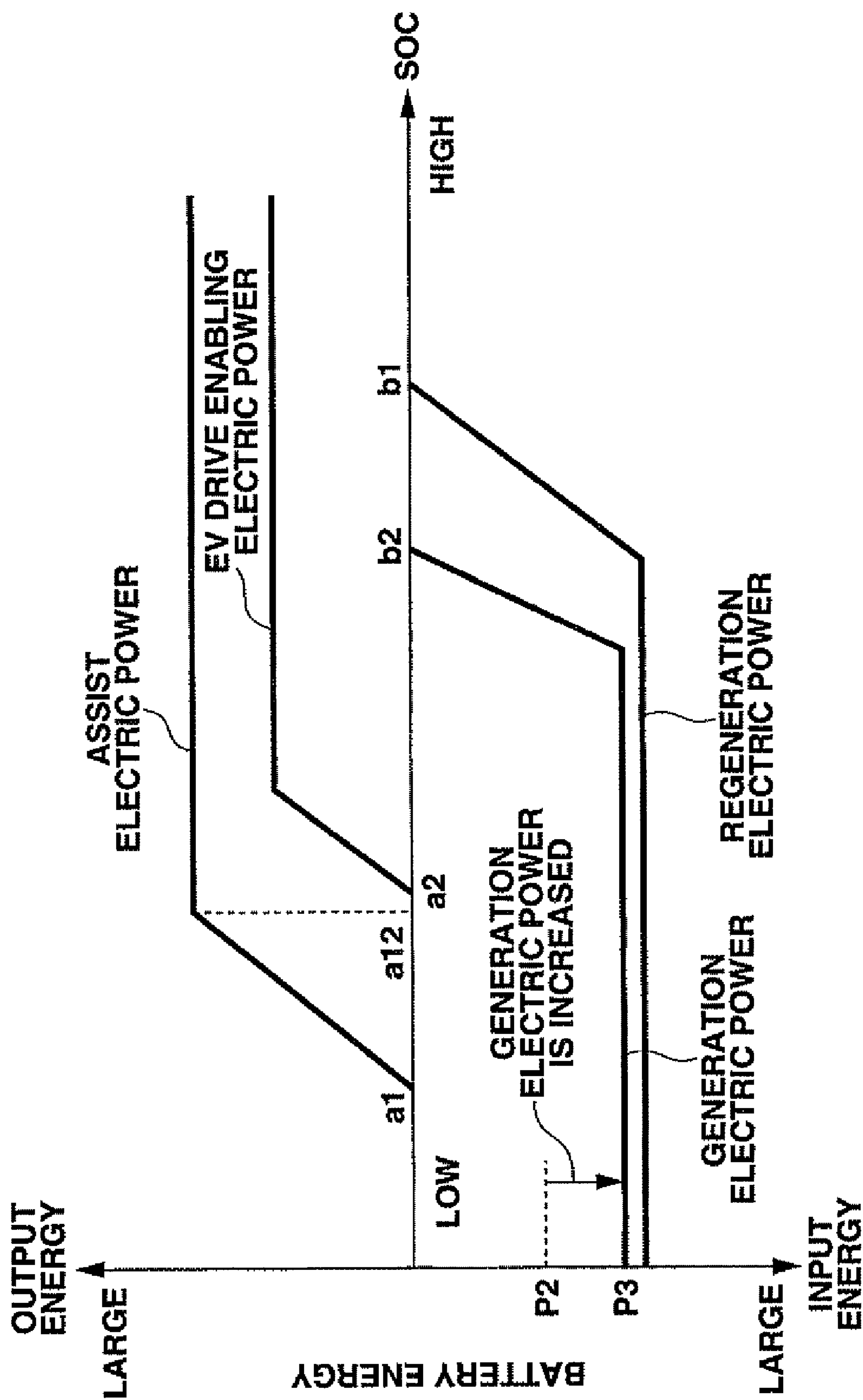
FIG. 12 is a chargeable/dischargeable electric power graph for a power mode.

Preferably, although not necessarily, the maximum acceptable electric power P2 shown in the battery chargeable/dischargeable electric power map is changed at the power mode so as to become larger. FIG. 12 is a battery chargeable/dischargeable electric power map in which the maximum acceptable electric power is changed from P2 to P3. P3 is larger than P2 and is positioned lower than P2 in FIG. 12.

By making such a change, the likelihood of a response of NO in step S6 of FIG. 9 is increased so that the case where the engine torque of the operating point e2 is larger than the engine torque of the operating point e1 increases. Accordingly, by keeping the state of charge of the battery 9 larger than usual, the insufficiency of the electric power at the power mode can be improved.

Hereinafter, the operation and effect of the first and second embodiments are described. In the embodiments, the target engine torque can be realized with a good responsiveness by previously keeping the engine torque large and by controlling the quick-response motor-generator torque. This is clear from FIGS. 6, 7 and 10, where at the power mode in which the drive mode required by the driver attaches greater importance to the acceleration performance (in step S1 of FIGS. 5 and 9, YES), the operating point e comprised of the power mode engine torque that is larger than the optimum fuel consumption efficiency engine torque on β is determined as the target engine torque. Accordingly, it becomes unnecessary to change the engine torque in accordance with the accelerator pedal depression amount at the power mode such that a drive torque having a good responsiveness can be realized. Further, without the necessity of making the motor-generator larger in size and weight, a motor-generator capable of outputting a maximum torque at the same level as a conventional motor-generator can be used.

As shown in FIG. 6, since in the first embodiment the motor-generator torque is determined so as to assume a negative value when the target drive torque of the vehicle at the power mode (point t) is smaller than the power mode engine torque (point e), a target drive torque having a good responsiveness can be realized even at low-load drive and without changing the engine torque. It also becomes possible to supply a generation electric power to the battery 9.

As shown in FIG. 7, since in the first embodiment the motor-generator torque is determined so to assume a positive value when the target drive torque of the vehicle at the power mode (point t) is larger than the power mode engine torque (point e), a target drive torque having a good responsiveness can be realized even at high-load drive and without changing the engine torque. It thus becomes possible to assist the drive power of the rear wheels 2.

Further, the maximum throttle opening degree engine torque, that is, the engine torque at the maximum throttle opening degree of the engine, is determined as the power mode engine torque in step s7 of the second embodiment. Accordingly, the target drive torque can be realized with good responsiveness by maximizing the engine torque previously and by the control of the quick-response motor-generator torque. Also, the opportunity for generation of the battery 9, such as during low-load drive, can be increased.

Since in the second embodiment the state of charge SOC of the battery 9 that supplies and receives electric power to and from the motor-generator 5 is detected in step S6 of FIG. 9, and the power mode engine torque is determined according to the detected state of charge SOC in the next step S8, overcharge of the battery 9 can be avoided.

In this embodiment, the generation electric power P1 of the motor-generator at the maximum throttle opening degree engine torque is calculated in step S5, the maximum acceptable electric power P2 is calculated in step S6, and the engine torque is determined that realizes both the motor-generator torque output the maximum acceptable electric power P2 and the target drive torque. Thus, in a case where the maximum acceptable electric power P2 is smaller than the generation electric power P1, the battery 9 can be protected from overcharge through using the power mode engine torque in place of the maximum throttle opening degree engine torque (step S8 in place of step S7).

Further, in a case where the maximum acceptable electric power is smaller than the generation electric power, the power mode engine torque is changed gradually from the maximum throttle opening degree engine torque (step S7) to the engine torque for protection (step S7) during the time from the moment t0 to the moment t11. As a result, the input torque to the transmission input shaft 3*a*, which is the sum of the engine torque and the motor-generator torque, can be maintained at a constant value with ease. For this reason, the drive torque for the vehicle can be maintained constant as shown by the dotted line in FIG. 11, and unintended torque variation can be prevented.

As shown in FIG. 12, the maximum acceptable electric power can be changed to P3 at the power mode so as to become larger than the maximum acceptable electric power P2 of the power source at the usual time at which the drive mode required by the driver attaches greater importance to the fuel consumption efficiency. By this, the state of charge of the battery 9 is kept larger than usual such that the insufficiency of the electric power of the battery 9 at the power mode can be improved.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A hybrid vehicle drive control apparatus for a vehicle including an engine and a motor-generator, the apparatus comprising:

a controller configured to generator to obtain a target drive torque wherein the target drive torque is equal to the sum of determine whether a drive mode requested by a driver is a power mode that attaches greater importance to an acceleration performance than to a fuel consumption efficiency, and to control a motor-generator torque of the motor-generator to obtain a target drive torque that is equal to the sum of an engine torque of the engine and the motor-generator torque, the controller further configured to set a target engine torque of the engine to a power mode engine torque that is larger than an optimum fuel consumption efficiency engine torque when the power mode is requested by the driver, and when the target drive torque is smaller than the power mode engine torque, the motor-generator torque is a negative value and the controller controls the motor-generator to function as a generator, and when the target drive torque is larger than the power mode engine torque, the motor-generator torque is a positive value and the controller controls the motor-generator to function as a motor.

2. The apparatus according to claim 1 wherein the power mode engine torque is equal to a maximum throttle opening degree engine torque that is an engine torque at a maximum throttle opening degree of the engine.

3. The apparatus according to claim 1 wherein the controller is further configured to determine the power mode engine torque in accordance with a state of charge of a power source configured to supply electric power to and receive electric power from the motor-generator.

4. The apparatus according to claim 2 wherein the controller is further configured to:

calculate a generation electric power of the motor-generator at the maximum throttle opening degree of the engine;

calculate a maximum electric power of a power source configured to supply electric power to and receive electric power from the motor-generator; and determine the power mode engine torque as a protection engine torque that realizes both of a motor-generator torque outputting the maximum electric power and the target drive torque where the maximum electric power is smaller than the generation electric power.

5. The apparatus according to claim 4 wherein the controller is further configured to change the power mode engine torque gradually from the maximum throttle opening degree engine torque to the protection engine torque when the maximum electric power becomes smaller than the generation electric power during operation in the power mode.

6. The apparatus according to claim 4 wherein the controller is further configured to make the maximum electric power larger than a maximum electric power of the power source during a usual operation where a drive mode requested by the driver attaches greater importance to the fuel consumption efficiency.

7. A hybrid vehicle drive control apparatus for a vehicle including an engine and a motor-generator, the apparatus comprising:

means for obtaining a target drive torque that is equal to the sum of an engine torque of the engine and the motor-generator torque;

means for selecting a target engine torque of the engine that is larger than an optimum fuel consumption efficiency engine torque when acceleration performance is preferred over fuel consumption efficiency; and means for controlling a motor-generator based on the target drive torque.

8. A method for controlling a hybrid vehicle including an engine and a motor-generator, the method comprising:

controlling a motor-generator torque of the motor-generator to obtain a target drive torque that is equal to a sum of an engine torque of the engine and the motor-generator torque; and using a power mode engine torque that is larger than an optimum fuel consumption efficiency engine torque as a target engine torque of the engine when acceleration performance is preferred over fuel consumption efficiency, wherein controlling the motor-generator torque comprises operating the motor-generator as a generator when the target drive torque is smaller than the power mode engine torque and operating the motor-generator as a motor when the target drive torque is larger than the power mode engine torque.

9. The method according to claim 8 wherein the power mode engine torque is equal to a maximum throttle opening degree engine torque that is an engine torque at a maximum throttle opening degree of the engine.

10. The method according to claim 8, further comprising:

determining the power mode engine torque in accordance with a state of charge of a power source configured to supply electric power to and receive electric power from the motor-generator.

11. The method according to claim 9, further comprising:

calculating a generation electric power of the motor-generator at the maximum throttle opening degree of the engine;

calculating a maximum electric power of a power source configured to supply electric power to and receive electric power from the motor-generator; and determining the power mode engine torque as a protection engine torque that realizes both of a motor-generator torque outputting the maximum electric power and the target drive torque where the maximum electric power is smaller than the generation electric power.

12. The method according to claim 11, further comprising:

changing the power mode engine torque gradually from the maximum throttle opening degree engine torque to the protection engine torque when the maximum electric power becomes smaller than the generation electric power during operation in the power mode.

13. The method according to claim 11, further comprising:

making the maximum electric power larger than a maximum electric power of the power source during a usual operation where a drive mode requested by the driver attaches greater importance to the fuel consumption efficiency.

* * * * *